United States Patent
Harris et al.

(10) Patent No.: US 12,304,624 B2
(45) Date of Patent: May 20, 2025

(54) HYBRID AIRCRAFT AND LANDING LAUNCH/RECOVERY SYSTEM

(71) Applicant: Leigh Aerosystems Corporation, Vista, CA (US)

(72) Inventors: Gordon L. Harris, Vista, CA (US); Stephen L. Harris, Vista, CA (US)

(73) Assignee: Leigh Aerosystems Corporation, Vista, CA (US)

( * ) Notice: Subject to any disclaimer, the term of this patent is extended or adjusted under 35 U.S.C. 154(b) by 86 days.

(21) Appl. No.: 18/349,822

(22) Filed: Jul. 10, 2023

(65) Prior Publication Data

US 2023/0406489 A1     Dec. 21, 2023

Related U.S. Application Data

(63) Continuation-in-part of application No. 18/321,992, filed on May 23, 2023, now abandoned, and a continuation-in-part of application No. 16/995,534, filed on Aug. 17, 2020, now Pat. No. 11,697,508.

(60) Provisional application No. 63/508,657, filed on Jun. 16, 2023, provisional application No. 63/479,500, filed on Jan. 11, 2023, provisional application No. 62/887,210, filed on Aug. 15, 2019.

(51) Int. Cl.
| | |
|---|---|
| *B64U 10/20* | (2023.01) |
| *B64C 3/56* | (2006.01) |
| *B64C 27/26* | (2006.01) |
| *B64D 27/02* | (2006.01) |
| *B64D 27/10* | (2006.01) |
| *B64D 27/24* | (2006.01) |
| *B64U 70/93* | (2023.01) |

(52) U.S. Cl.
CPC ............. *B64C 27/26* (2013.01); *B64C 3/56* (2013.01); *B64D 27/10* (2013.01); *B64D 27/24* (2013.01); *B64D 27/026* (2024.01); *B64U 10/20* (2023.01); *B64U 70/93* (2023.01)

(58) Field of Classification Search
CPC ........... B64C 27/26; B64C 3/56; B64D 27/24; B64D 27/10; B64D 27/026
See application file for complete search history.

(56) References Cited

U.S. PATENT DOCUMENTS

| | | | | |
|---|---|---|---|---|
| 2012/0091257 A1* | 4/2012 | Wolff | ..................... | B64U 30/26 |
| | | | | 244/12.4 |
| 2014/0158816 A1* | 6/2014 | DeLorean | ............... | B64C 39/12 |
| | | | | 244/12.4 |
| 2017/0240274 A1* | 8/2017 | Regev | ..................... | B64D 35/02 |
| 2019/0135424 A1* | 5/2019 | Baity | ..................... | B64U 20/77 |
| 2019/0375495 A1* | 12/2019 | Pfammatter | ............ | B64C 27/28 |
| 2020/0108919 A1* | 4/2020 | Sada | ....................... | B64C 27/20 |
| 2020/0115045 A1* | 4/2020 | Mermoz | ............. | B64C 29/0033 |

(Continued)

*Primary Examiner* — Tye William Abell
(74) *Attorney, Agent, or Firm* — Mintz Levin Cohn Ferris Glovsky and Popeo, P.C.

(57) ABSTRACT

An aircraft includes a fuselage extending along a first x-axis and a wing assembly including a first wing an a second wing. A first power assembly of the aircraft includes a first propulsion element and a first electric motor while a second power assembly includes a second propulsion element and a second electric motor. The aircraft further includes a third power assembly positioned aft of the first power assembly and the second power assembly. The third power assembly includes a third propulsion element and an internal combustion engine.

8 Claims, 9 Drawing Sheets

(56) References Cited

U.S. PATENT DOCUMENTS

2020/0239137 A1\* 7/2020 Regev ................. B64C 29/0033
2022/0315216 A1\* 10/2022 Kaplinsky .............. B64D 27/24

\* cited by examiner

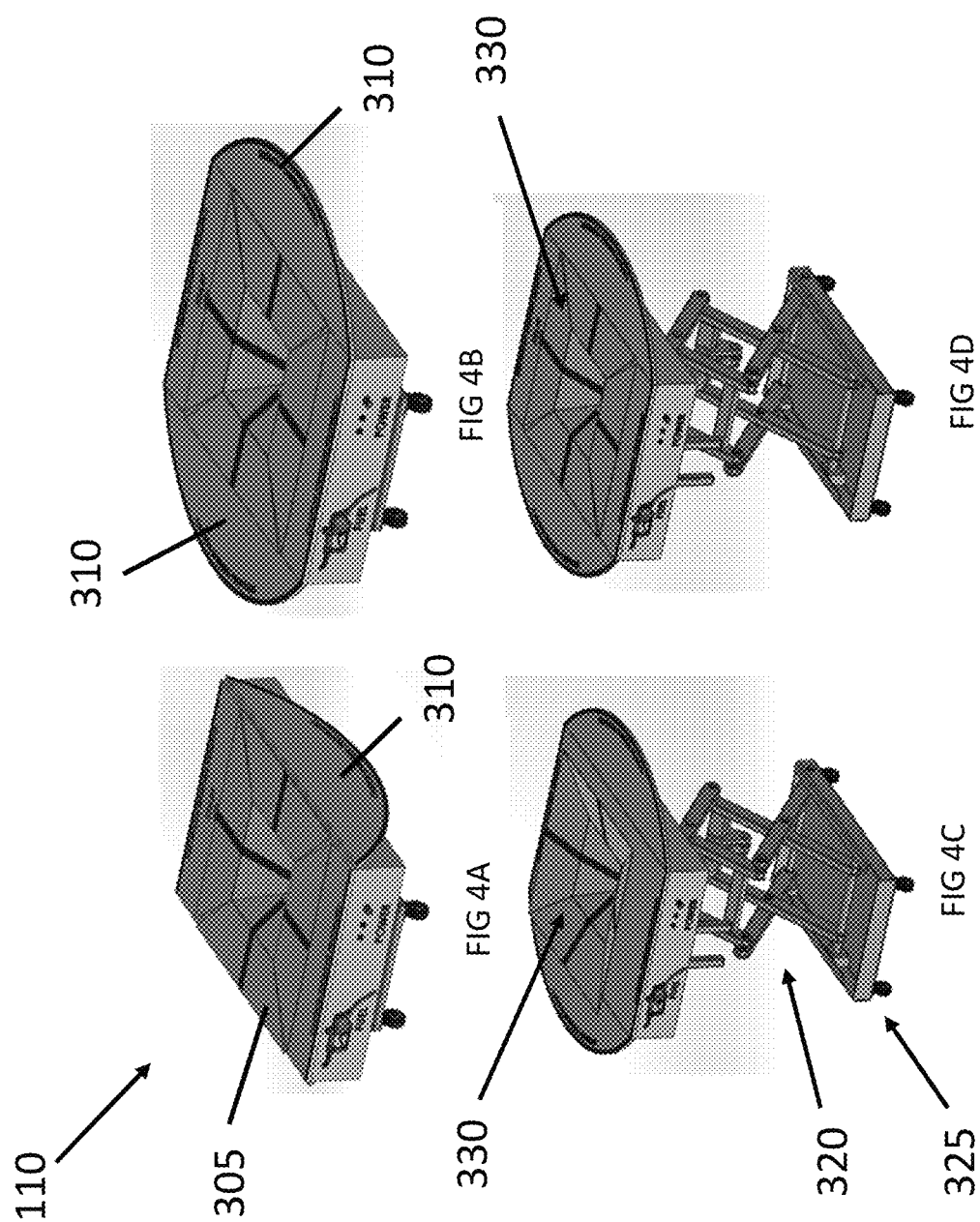

HYBRID AIRCRAFT AND LANDING LAUNCH/RECOVERY SYSTEM

CROSS REFERENCE TO RELATED APPLICATIONS

This application is a continuation-in-part of U.S. patent application Ser. No. 16/995,534, filed on Aug. 17, 2020, issuing on Jul. 11, 2023 as U.S. patent Ser. No. 11/697,508, and claims priority to the following U.S. Provisional Patent Applications: (1) U.S. Provisional Application No. 63/508,657 filed Jun. 16, 2023 and (2) U.S. Provisional Application No. 63/479,500 filed Jan. 11, 2023. This application is also a continuation-in-part of U.S. patent application Ser. No. 18/321,992 filed May 23, 2023, which claims priority to U.S. Provisional Patent Application No. 62/887,210 filed Aug. 15, 2019. The disclosures of the aforementioned patent applications are hereby incorporated by reference in their entirety.

BACKGROUND

Existing technology for the design of fixed-wing aircraft capable of vertical takeoff and landing (VTOL) has focused on the use of four battery-driven vertical-axis propellers to provide lift. The aircraft then includes a fifth powerplant (electric or petrol) to provide forward thrust. This is called a parallel hybrid system. Other configurations use a "serial hybrid system" wherein an engine is attached to an alternator which powers the vertical and/or forward flight propulsors.

Each of the four vertical thrusters incudes a battery pack, motor speed controller, wiring and propeller which collectively and substantially increase the overall weight of the aircraft. To limit this weight impact, engineers have compensated by minimizing the size and power of the horizontal propulsion engine. But this limits the aircraft's operational ceiling and its top speed which restricts its ability to pursue targets and penetrate headwinds. There is thus a need for improved aircraft with vertical takeoff and landing capabilities.

In addition, recovery of a VTOL unmanned aerial vehicle (UAV) in high winds and elevated sea-safe conditions on ships at sea is an extremely challenging problem. This is true even if the ship provides a large amount of deck space for flight operations. For example, in Navy and Coast Guard non-aviation-capable patrol boats, deck space is either very limited or even unavailable due to the typically large amount of equipment stored on the ship deck. Even in cases where some flat deck space might be available for a UAV, the typical 4-ft high safety railings on many vessels pose a further hazard to larger wingspan UAV's descending to the deck. There is this a need for improved systems and methods for launch and recovery of a VTOL UAV.

SUMMARY

Disclosed herein is a hybrid aircraft system that uses a combination of direct propeller driven gas engine and electric motor power to provide vertical thrust and control for hover of the aircraft in which the engine effectively lifts its own weight while reducing the overall electrical system requirements. In an embodiment, the system additionally uses only gas power and aerodynamic stability and control for forward flight. As such, this system enables a combination of efficient vertical lift performance and the forward flight efficiency of a conventional gas-powered aircraft without the disadvantages of prior configurations. In an embodiment, the aircraft includes an alternator directly connected to the engine wherein it supplies electricity to the vertical lift motors during hover using half (or less) of the engine's total horsepower and minimizes the battery size and weight, because no stored energy is required to hover.

Also disclosed is a launch/recovery system for a Vertical Takeoff and Landing (VTOL) Unmanned Air Vehicle (UAV). The launch/recovery system can be used for launch, recovery, and maintenance including general accessing of a UAV and the storage of fuel, AV charger, starter, and tools. The launch/recovery system has many military and civilian applications such as coastal and offshore patrol by Coast Guard vessels. Such vessels can greatly benefit by having a UAV capability to surveil wide areas around Coast Guard vessels. However, such Coast Guard vessels (and other similar vessels) are not configured to be aviation capable. Although some such vessels have relatively flat aft or forward decks that might accommodate landing of a VTOL UAV, these decks are most often encumbered by various objects such as lifeboats, davits, tanks, etc. Even those that have relatively clear decks still have safety railings that are likely to jeopardize landings in higher sea states.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

FIGS. 4A-4D show the launch/recovery system in various stages of movement.

DETAILED DESCRIPTION

Disclosed herein is a hybrid aircraft system that uses a combination of direct propeller driven gas engine and electric motor power to provide vertical thrust and control for hover of the aircraft. Also disclosed is a portable launch/recovery system for a Vertical Takeoff and Landing (VTOL) Unmanned Air Vehicle (UAV). The system is configured to enable ships with limited available deck space to become UAV-compatible.

Figure 1:
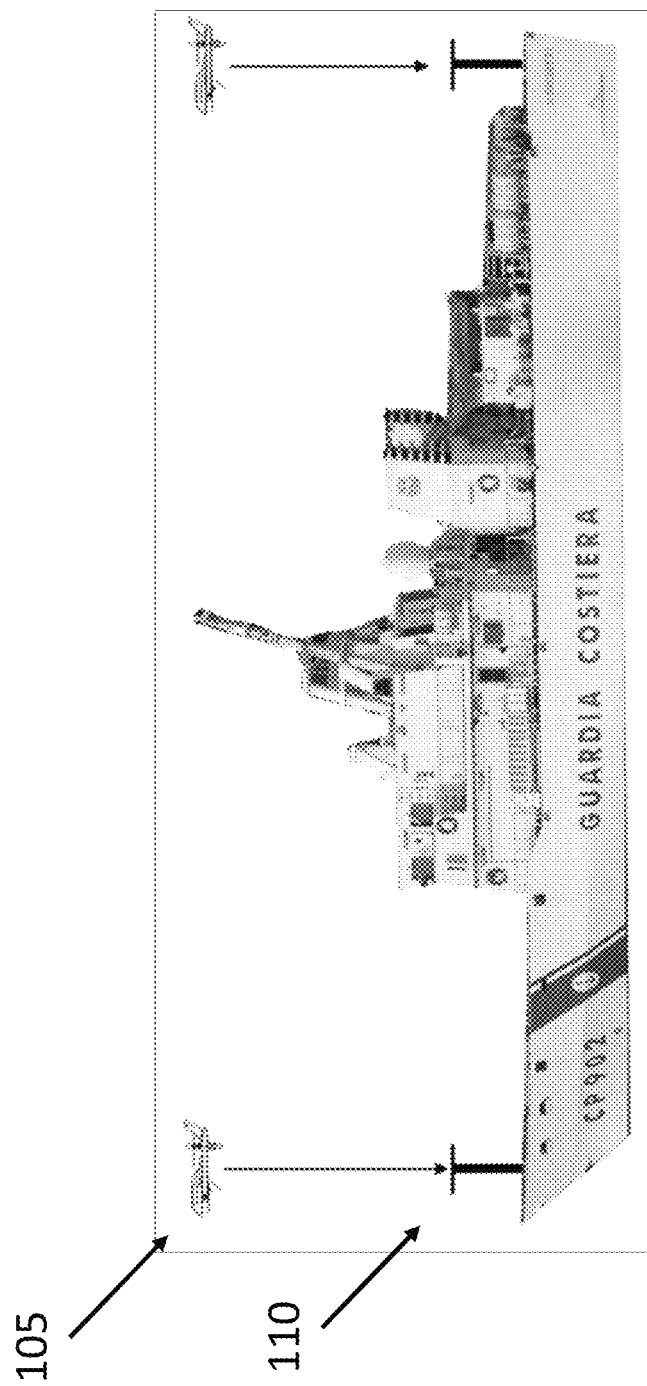
FIG. 1 shows an example watercraft.

FIG. 1 shows a side view of an example sea vessel (such as a Coast Guard vessel in a non-limiting embodiment) with a launch/recovery system 110 positioned on the vessel. The launch/recovery system can also be referred to as a platform or deck. It should be appreciated that the locations of the system 110 on the vessel are for example purposes only and that the locations can vary.

The type of aircraft configured to take off and land on the system 110 can vary. In an embodiment, the aircraft is a VTOL UAV aircraft 105.

Hybrid Aircraft System

Figure 2:
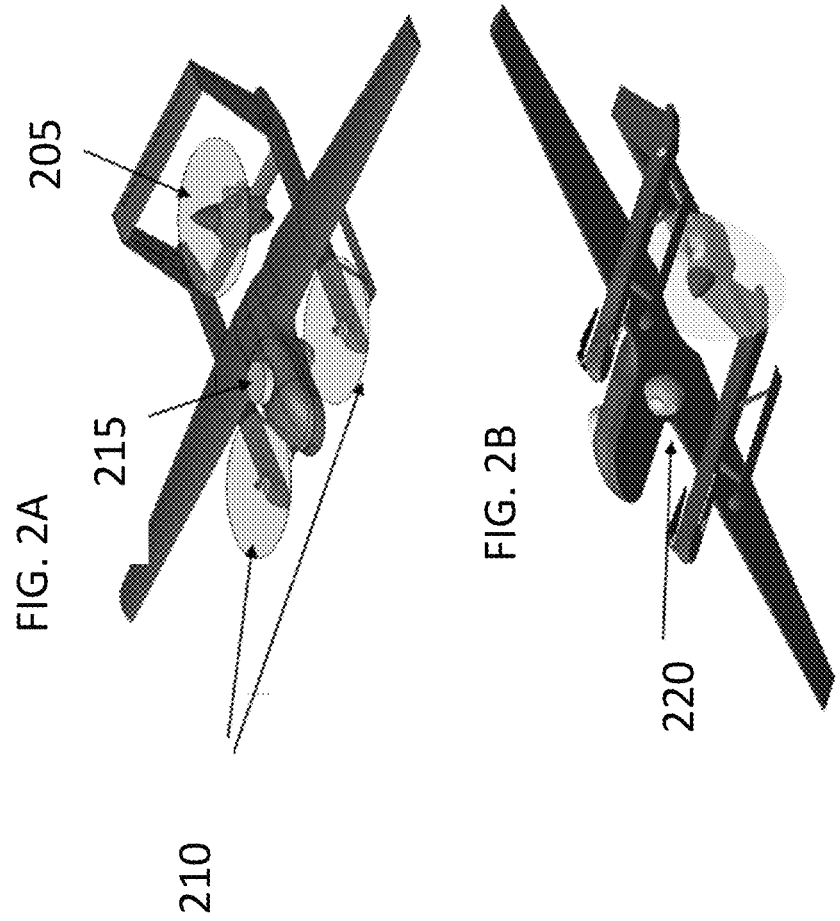
FIGS. 2A and 2B show an example of a hybrid vertical takeoff and landing (VTOL) aircraft.

An embodiment of a hybrid aircraft has a hybrid lift and propulsion system that provides benefits of a quad copter with the utility of a high-performance airplane. FIGS. 2A and 2B show an example embodiment. The aircraft includes a pair of propellers 210 that are positioned on a forward location of the aircraft such as forward of a midpoint along the length of the fuselage. The propellers 210 are configured to rotate between a vertical orientation (wherein the propellers face downward) and a horizontal orientation (wherein the propellers face forward). The vertical orientation provides the propellers in vertical rotational axis orientation to provide vertical lift. The horizontal orientation provides the propellers in horizontal rotational axis orientation to provide forward thrust. The propellers 210 are powered by an electrical engine. The aircraft further includes a third propeller 205 on a rearward location of the aircraft. The propeller 205 is also configured to rotate between a similar vertical orientation and a horizontal orientation. The propeller 205 is powered by an internal combustion engine such as a gasoline engine.

An example advantage of this configuration is that only half of the number of vertical thrusters are required, allowing the installation of a much more powerful engine for the same weight resulting in significantly higher airspeed and greater operational ceiling. Moreover, since the gasoline engine (which has thirty times the energy density of the best battery technology) is used for vertical thrust as well, the aircraft's hovering time is substantially increased over configurations using quad electric thrusters.

Aircraft Access Launch/Recovery System

Figure 3:
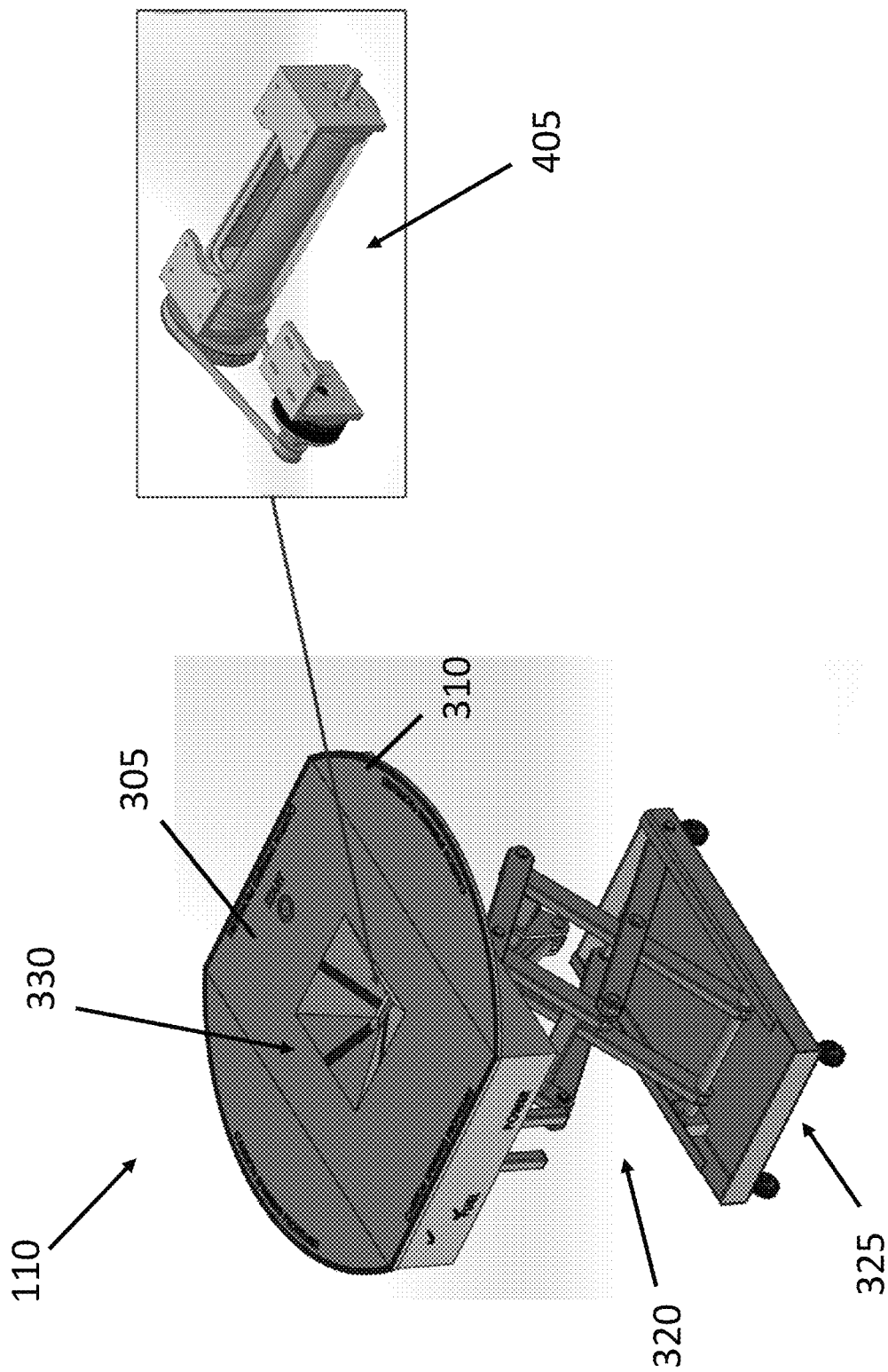
FIG. 3 shows a perspective view of an aircraft launch/recovery system.

FIG. 3 shows a perspective view of a launch/recovery platform system 110. The launch/recovery system 110 provides an elevated deck or platform with a horizontal surface configured to support an aircraft such as a VTOL UAV. A vertical height of the horizontal surface can be adjusted pursuant to an actuation mechanism, as described below. In an embodiment, the launch/recovery system 110 is portable and can be moved around an upper platform of a seacraft to a desired location. The launch/recovery system 110 includes an upper platform that is configured to transition between a reduced height position (e.g., a compacted state) and a relatively increased height position (e.g., an elevated state) with an increased vertical position relative to a surface upon which the launch/recovery system is positioned. In this regard, the launch/recovery system includes an expansion mechanism that mechanically expands, such as along a vertical axis, to increase a height of the upper platform. In an embodiment, the expansion mechanism can mechanically expand and contract while the aircraft is positioned atop the upper platform. In an embodiment, actuation of the expansion mechanism occurs by an aircraft hovering above the upper platform and dropping a tethered actuator into a bucket or opening of the upper platform. The tethered actuator interacts with a winch system to cause the winch system to rotate and actuate the expansion mechanism thereby expanding and/or contracting the expansion mechanism. The upper platform has an upper surface sized and shaped to support an aircraft.

With reference to FIG. 3, the launch/recovery system 110 includes an upper platform 305 that provides a surface upon which an aircraft can be supported such as during a takeoff, landing, and/or in a state of rest. The surface can be a horizontal flat surface although the contour may vary. The upper platform 305 includes one or more extender wings 310 that can transition between a furled or folded state and an unfolded state. FIG. 3 shows the wings 310 in the unfolded state where the wings have surfaces (such as upper surfaces) that align with the surface of the upper platform 305. Thus, the wings, when unfolded, thereby expand the total surface area of the upper platform 305. The wings 310 can also be transitioned into a folded state wherein the wings 310 fold downward and/or inward to provide a more compact overall shape for the launch/recovery system 110, as described further below.

The upper platform 305 is positioned atop an expandable structure 320, such as an accordion-like structure that sits upon a bottom base 325. The structure may be formed, for example, by a plurality of interconnected trusses that are rotatably connected at ends to expand and contact. The bottom base 325 may be positioned directly atop a surface such as the deck surface of a seacraft. The expandable structure 320 can transition between a folded state where the expandable structure is lowered relative to the bottom base 325 and an unfolded or expanded state where the expandable structure is partially or fully expanded such that the height of the upper platform 305 is increased relative to the bottom base 325. In this manner, the expandable structure 320 can raise and lower the height of the upper platform 305.

With reference still to FIG. 3, the upper platform 305 includes an opening 330 (or bucket) that leads to an internal location in which a winch mechanism 405 is positioned. The opening 330 can be defined by a plurality of movable surfaces that provide one or more inclined surfaces that funnel downwardly into a location where the winch mechanism is positioned. The winch mechanism 405 can be actuated to transition the expandable structure 320 between the folded and the expanded states and thereby lift and lower the upper platform 305. This is described in more detail below.

FIG. 4A shows the launch/recovery system 110 in the compacted or folded state wherein the expandable structure 320 (FIG. 3) is folded such that the upper platform 305 is in a vertically reduced position. The wings 310 are also folded such that the upper platform 305 has a reduced surface area relative to when the wings 310 are expanded. The expandable structure 320, when folded, may be housed within a housing structure of the upper platform 305 and/or the bottom base 325.

FIG. 4B shows the launch/recovery system 110 with the wings 310 in the unfolded state such that the wings 310 increase the overall surface area of the upper platform 305. The wings 310 can be transitioned between the folded and the unfolded state automatically using a motor or upon the occurrence of a certain event. Or, the wings 310 can be manually transition between the folded and the unfolded state such as by a user. In an embodiment, the wings 310 automatically transition to the unfolded state as the upper platform 305 is raised and also automatically transition to the folded state as the upper platform 305 is lowered.

FIG. 4C shows the launch/recovery system 110 with the expandable structure 320 in the expanded state. The expandable structure 320 has been expanded such that the upper platform 305 has been lifted or otherwise elevated upwards relative to the bottom base 325. The height of the upper platform 305 is thus greater when the expandable structure is expanded relative to when the expandable structure is contracted or folded. FIG. 4D shows the launch/recovery system 110 in a fully expanded state. Note that the opening 330 may decrease in size when the launch/recovery system is fully expanded such as by one or more panels being moved to a position that decreases the size of the opening 330 and also increases the flat, upper surface area of the upper platform 305.

Figure 5B:
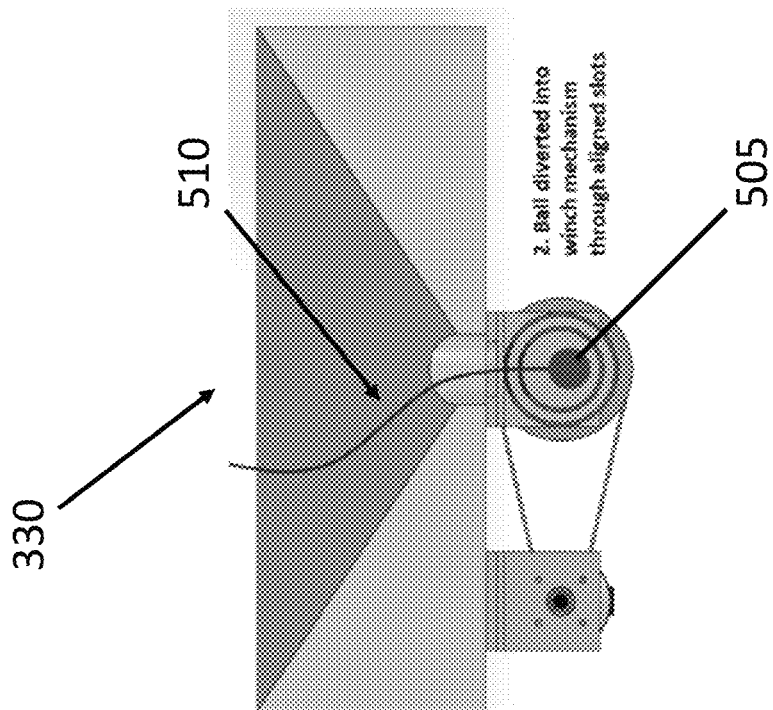
FIGS. 5A-5D show examples of an actuation mechanism of the launch/recovery system.
Figure 5A:
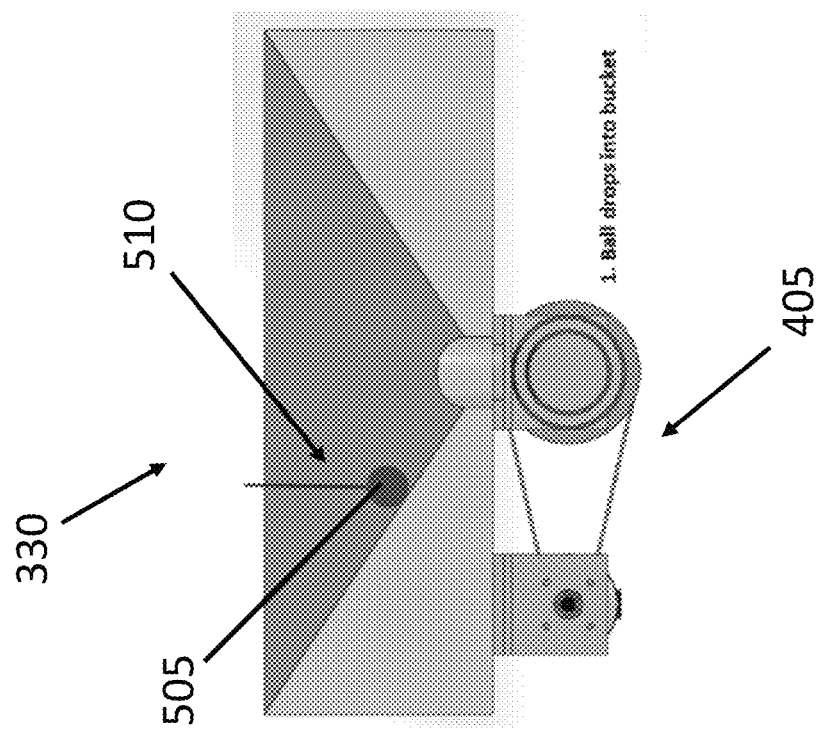

FIG. 5A shows a cross-sectional view of a portion of the upper platform showing the opening 330. The opening 330 (or structure that defines the opening) defines at least one sloped surface that leads to the winch mechanism or winch system 405, which is disposed within a housing of the upper platform. The winch system 405 is actuated by dropping a tethered actuation structure, such as a ball 505 into the opening 330. The ball can be attached to a tether 510 that is attached to the aircraft or other structure. As shown in FIG. 5B, the ball 505 drops into the winch mechanism 330 such as via a slot in a portion of a housing of the winch mechanism 330. The tethered actuation structure then mechanically engages the winch mechanism such as by wrapping around at least a portion of the winch mechanism such as a portion that causes the winch mechanism to wind.

Figure 5C:
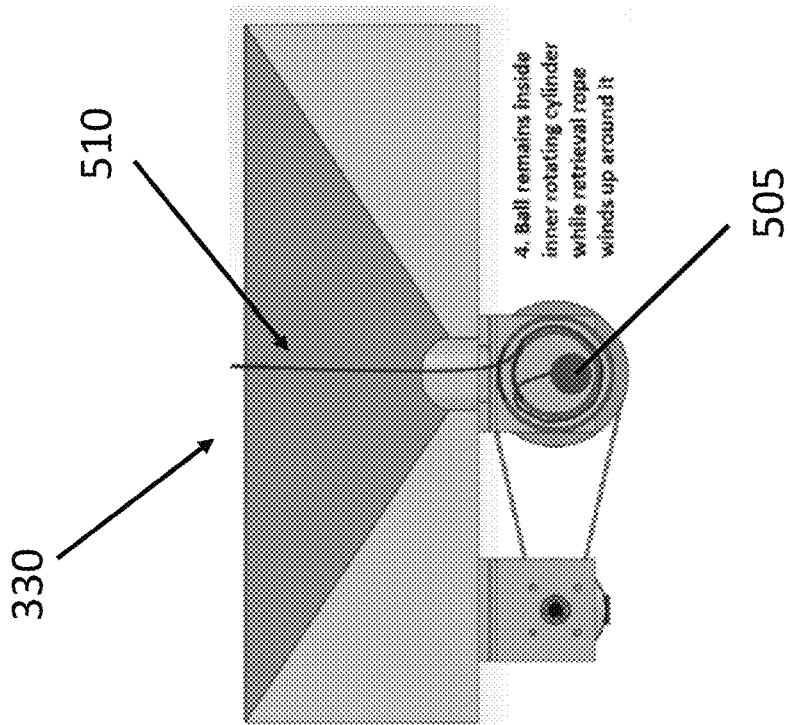
Figure 5D:
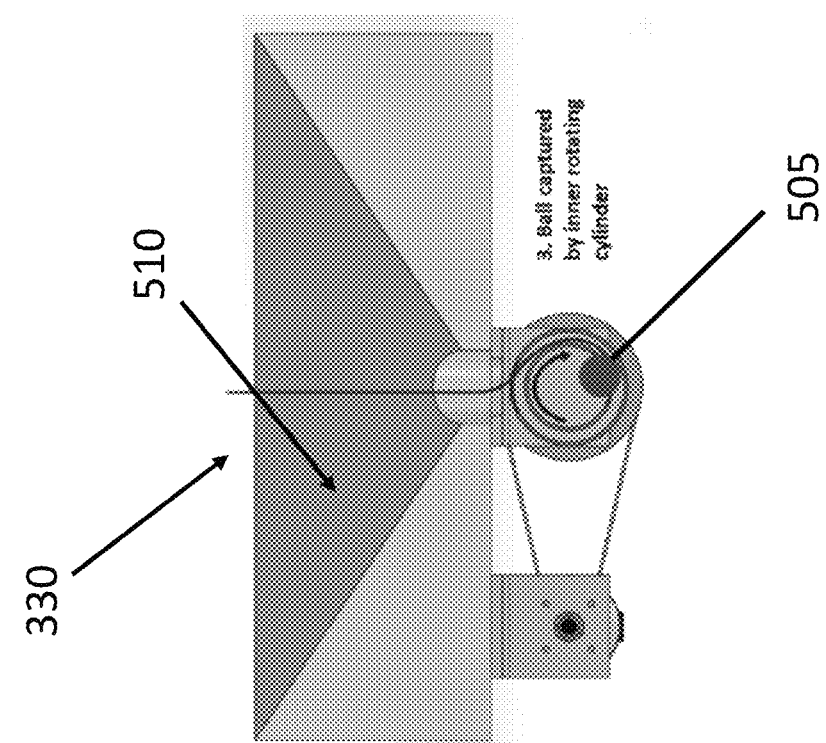

With reference to FIG. 5C, the ball 330 is captured within the winch mechanism, such as within a rotating cylinder. The cylinder rotates while the ball remains therein thereby causing the tether 510 to wind up around the cylinder (or another portion of the winch system) and thereby actuate the winch mechanism 330. The winch mechanism is mechanically coupled to the expandable structure 320 such that the winch mechanism 405 causes the expandable structure 320 to expand or contract as the winch mechanism is actuated.

The system can operate pursuant to method of use, such as a launch sequence. In an initial Setup step, an operator clears an area around the launch/recovery system, which is positioned on a deck of a seacraft for example. The operator performs UAV preflight procedures, if any. During this step, the upper platform 305 of the launch/recovery system 110 is at a level or vertical position that allows the human operator easy access to the UAV positioned upon the upper platform 305. For example, the upper platform can be at a height wherein an average human can physically touch the UAV while standing on the deck of the seacraft. In a subsequent Launch step, the upper platform 305 elevates (or self-elevates) so that the UAV, which positioned on the upper platform 305, is clear of any objects in a surrounding area. A remotely controlled starter can be engaged to start the engine of the UAV. Retaining pins, if present, are removed to release the UAV from the launch/recovery system 110. This frees the UAV to climb vertically away from the launch/recovery system 110 and the seacraft. Once safely away from the seacraft, the UAV can then transition to cruising flight.

A method of use, such as an aircraft recovery sequence, is now described for the launch/recovery system. In an initial Capture step, the UAV automatically navigates to a pre-set position, such as in a hover state, above the upper platform 305 of the launch/recovery system 110. Once in stable hover, the UAV drops a tether 510 (FIGS. 5A-5D), such as a plum-bob-weighted 'capture' line. An operator can then insert the tether and attached ball 505 into the winch receptacle opening 330 or "bucket" of the launch/recovery system 110. The ball 505 then mechanically engages the winch system as described above. Tension can be applied to the tether to cause the tether and ball to wind the winch system and actuate the system. The upper platform 305 than can be winched down at a controlled rate. The UAV is then recovered securely on the upper platform and the locking pins are applied to secure the UAV to the launch/recovery system.

Figures 6, 7:
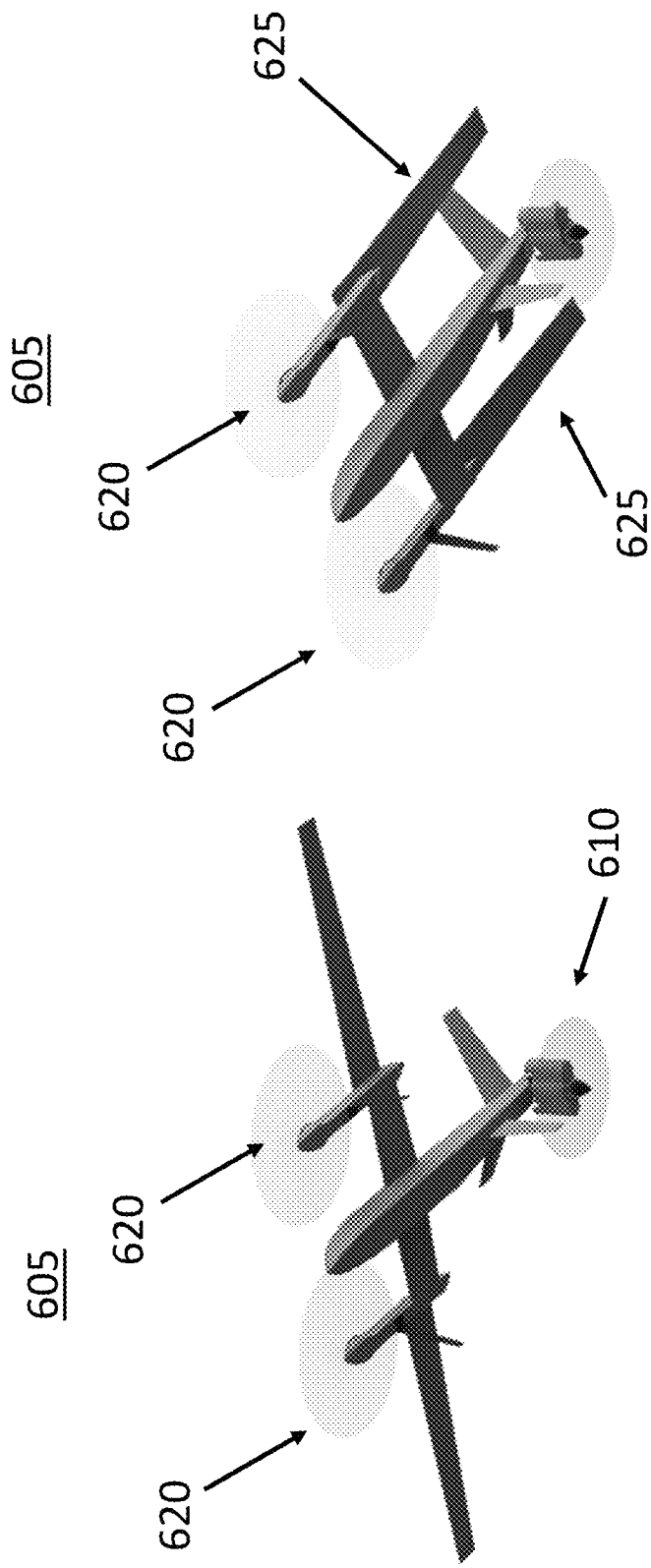
FIGS. 6-8 show the hybrid vertical takeoff and landing (VTOL) aircraft.

FIGS. 6 and 7 show a multi-mode hybrid aircraft 605, which has a propulsion architecture that includes a rear or aft-mounted power assembly 610 including a propeller that is coupled to or otherwise includes an internal combustion engine such as gas or diesel engine. The aft-mounted power assembly 610 can include or be coupled to a starter or alternator as well as an onboard battery mounted on or within the aircraft such as to boost the internal combustion engine in order to provide more total thrust.

Figure 8:
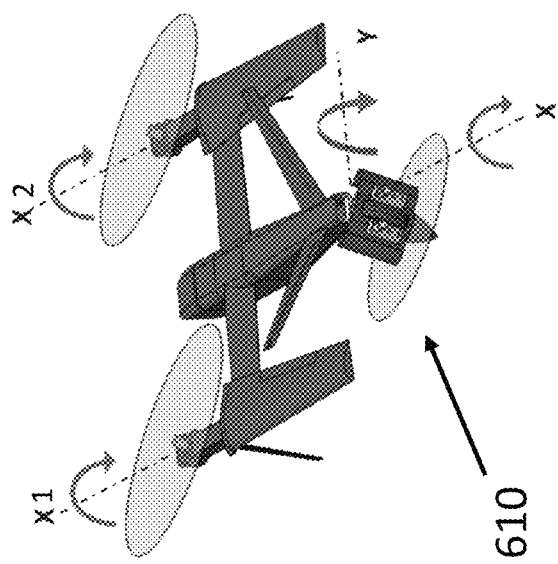

The aircraft 605 further includes a pair of forward mounted boom-mounted power assemblies 620 (or propulsion assembly) such as a first power assembly and a second power assembly that each includes a propulsion element, such as a propeller, and an electric motor used in combination to lift, propel, and control the aircraft in a manner described herein. At least a portion of each of the forward power assemblies 620 (such as the propellers) can rotate about respective X axes to provide yaw control and side force control. Thus, the power assemblies 620 collectively include a first propulsion element and a second propulsion element and a first electric motor and a second electric motor. In an embodiment, the forward power assemblies 620 are not coupled to an alternator and/or starter. The aircraft includes a fuselage that generally extends along an X-axis, and a pair of forward wings that at least partially extend along a Y-axis normal (or non-parallel) to the X-axis. At least a portion of the forward power assembly 620, such as the propellers, can rotate about a respective X-axis (X1 and X2 axes as shown in FIG. 8). The X1 axis and X2 axis can be parallel to the x axis (or long axis) of the fuselage and can extend through the respective power assembly. In an embodiment, at least the first propulsion element and the second propulsion element are positioned on the wings. In an embodiment, the aircraft includes no additional motors, whether electric or internal combustion, beyond the motors of the first, second and third power assemblies. Thus such an embodiment may include only the forward electric motors coupled to the forward propellers and rear internal combustion engine coupled to the rear propellers with no additional propellers or motors.

In an embodiment, the aircraft does not include any additional electric motors coupled to the first (or forward) propulsion element and the second (or forward) propulsion element beyond the first electric motor and the second electric motor and the aircraft does not include any additional internal combustion engine or electric motor coupled to the third or aft propulsion element.

The aft-mounted power assembly 610 (which can be referred to as a third power assembly) can be positioned along the fuselage such as directly on the fuselage or it can be distanced from the fuselage so that it is not directly on the fuselage.

The multi-mode propulsion architecture (which may be referred to as a "Hybrid Hover Drive") achieves high efficiency vertical flight using the simultaneous combination of one or two simple direct drive internal combustion engines each combined with a propeller, as well as one or more drone type motor/propulsors (such as electrical motors), which in combination with the internal combustion (IC) propeller, control both attitude and altitude. In comparison to existing parallel and serial fixed wing hybrid systems, the aircraft is configured to minimize (or otherwise reduce) the number of motors, speed controllers, cables and batteries required as much of the vertical lift is born by the internal combustion engine(s). In addition to effecting powerful yaw control in vertical flight, the tilting/pivoting aspect of the engine/propeller provides a lightweight way to enable high efficiency forward flight. Serial hybrid configurations can be better than the traditional parallel systems, however they have the disadvantage of having an additional speed controller, large motor, and a ~10% reduction in propulsive efficiency turning mechanical energy into electrical energy. They also have the problem of having an engine in the fuselage, which takes up room for payload and can be difficult to cool.

In an embodiment, the aft power assembly 610 (or a portion thereof) is mounted on a two-degree of freedom drive that enables at least a portion of the power assembly 610 it to be rotated or tilted (down) about a respective Y-axis, such as over a continuous range of 0 to −115 degrees. The power assembly 610 also laterally rotates (about its respective X-axis), such as through a continuous angle range of +25 degrees. The ranges of rotation can vary about both the respective X-axis and the Y-axis. The propeller of the aft power assembly 610 can thus be rotated about its respective X-axis and/or Y-axis to achieve variation in an orientation of the propeller.

As shown in FIG. 7, a wing assembly includes at least a pair of forward wings of the aircraft 605 (such as a first wing and a second wing) wherein each wing has an outboard wing panel 625 or wing region that can backward sweep to change position relative to an inboard portion of the wing. The wing panels 625 can be servo-driven (such as about a vertically-oriented pivot) to rotate (or otherwise move) to a continuous range of positions wherein the wing panels 625 are non-parallel to the inboard portion of the wing such as to a position that the wing panels 625 are generally parallel to the length of the fuselage of the vehicle. Such a configuration reduces the lateral footprint for deck landing and storage. The configuration shown in FIG. 7 can be referred to as a tri-rotor hover or slow flight configuration. During forward flight, the variable wing-sweep mechanization allows for in-flight adjustment of Aerodynamic Center (AC) to compensate for changing center of gravity positions that are associated with certain payloads, thereby enabling the carriage of a wide range payload types, weights and functions. The system is thus configured at a design or manufacture phase to increase, adjust, or vary a ratio of the distance between the rear and forward power assemblies to the center of gravity in order to have a pitch balanced system that magnifies the effect of increased thrust from the rear propulsion assembly.

Figure 9:
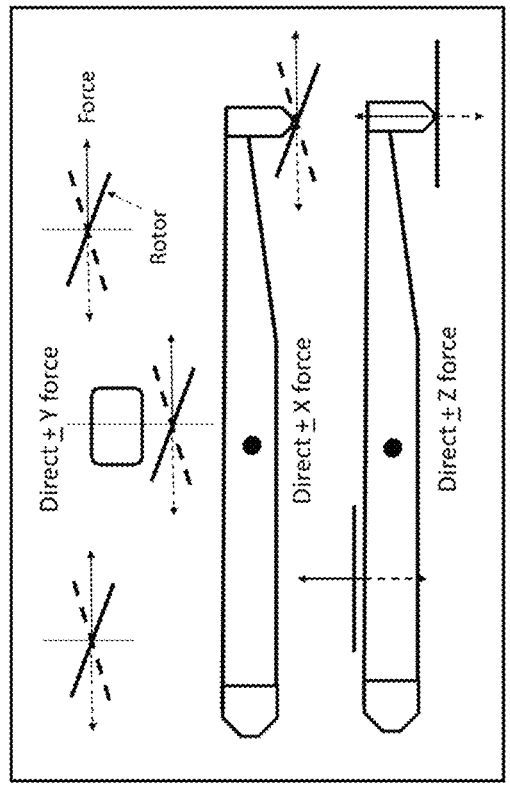
FIG. 9 shows an example force geometry of the aircraft.

FIG. 8 schematically shows additional details regarding an implementation of a direct-to-axis attitude and position controller. As mentioned, the aft power assembly 610 (or a portion thereof) rotates about the respective X-axis and/or the respective Y-axis. The forward propellers of the power assemblies 620 define rotational planes that rotate about their respective X axes (roll axes relative to X1 and X2). FIG. 9 schematically shows a vector diagram that illustrates the resulting force geometry. A combination the forward and aft rotor rotation about the respective X-axes enables a powerful yaw and lateral control that allows the platform to maintain a fixed heading and lateral position in the presence of side wind components without the need to bank the aircraft.

Figure 10:
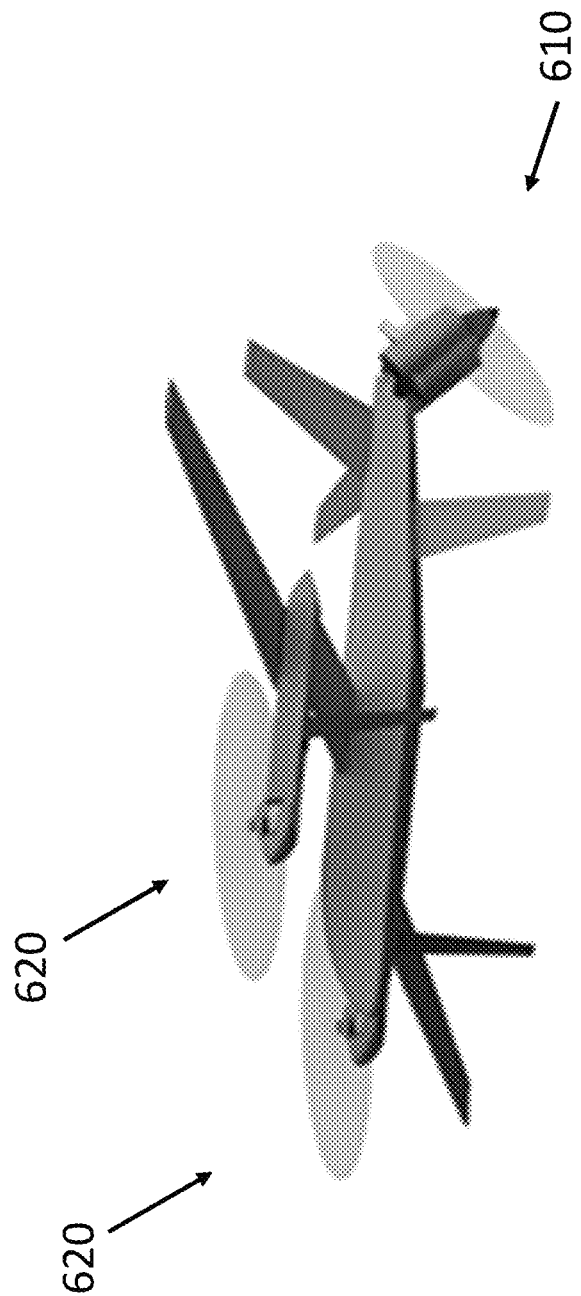
FIG. 10 shows the aircraft in a half-mode configuration.

FIG. 10 shows the aircraft flying in a "half-mode" configuration, wherein each aft power assembly 620 is set an angle around a respective Y-axis that offsets the aircraft drag at a given airspeed. This configuration enables the aircraft to maintain zero pitch attitude independent of wind-across deck speed when approaching and landing. The 3-axis attitude control and the direct-to axis positioning control combine to improve a degree of control of the vehicle in approach and landing, such as in elevated wind and sea-state conditions. By tightly controlling attitude and position simultaneously, spatial resolution of electro-optical (EO) based navigation systems is enhanced by allowing narrower sensor optical field of views to be utilized to view the landing space from longer distances.

As mentioned, rotation of the rear or aft engine and propulsion assembly 610 about its respective Y and X axes provides pitch and yaw controls respectively. The forward power and propulsion assemblies 620 rotate about respective X-axes. In addition, the outer wing panels 625 can retract in flight about the Z-axis, as shown in FIG. 7.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Although embodiments of various methods and devices are described herein in detail with reference to certain versions, it should be appreciated that other versions, embodiments, methods of use, and combinations thereof are also possible. Therefore, the spirit and endoscope of the appended claims should not be limited to the description of the embodiments contained herein.

The invention claimed is:
1. An aircraft, comprising:
a fuselage extending along a first x-axis;
a wing assembly including a first wing and a second wing;
a first power assembly that includes a first propulsion element and a first electric motor coupled to the first propulsion element;
a second power assembly that includes a second propulsion element and a second electric motor coupled to the second propulsion element;
a third power assembly positioned along the first axis aft of the first power assembly and the second power assembly, wherein the third power assembly includes a third propulsion element and an internal combustion engine coupled to the third propulsion element, wherein the entire internal combustion engine rotates about at least one axis;
wherein the entire first power assembly and the entire second power assembly can rotate about respective x-axes to provide yaw control and side force control of the aircraft; and
wherein the entire third power assembly rotates to provide pitch and yaw control and forward propulsion for the aircraft.
2. The aircraft of claim 1, wherein the first and second power assembly are used in combination with the third power assembly to lift, propel, and control the aircraft.

3. The aircraft of claim 1, wherein the first propulsion element, second propulsion element and third propulsion elements are propellers.

4. The aircraft of claim 1, wherein the first wing and the second wing each include an outboard wing portion that can sweep to change position relative to an inboard wing portion.

5. The aircraft of claim 1, wherein the aircraft does not include any additional electric motors coupled to the first propulsion element and the second propulsion element beyond the first electric motor and the second electric motor.

6. The aircraft of claim 1, wherein the aircraft does not include any additional internal combustion engine or electric motor coupled to the third propulsion element.

7. The aircraft of claim 1, wherein neither the first power assembly nor the second power assembly is coupled to an alternator.

8. The aircraft of claim 1, wherein neither the first power assembly nor the second power assembly is coupled to a starter.

* * * * *